(12) United States Patent
Sakamoto

(10) Patent No.: US 11,960,778 B2
(45) Date of Patent: Apr. 16, 2024

(54) COOPERATIVE COMMUNICATION BETWEEN MOBILE DEVICES AND IMAGE FORMING APPARATUSES

(71) Applicant: TOSHIBA TEC KABUSHIKI KAISHA, Tokyo (JP)

(72) Inventor: Daiki Sakamoto, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/882,660

(22) Filed: Aug. 8, 2022

(65) Prior Publication Data

US 2022/0382495 A1     Dec. 1, 2022

Related U.S. Application Data

(60) Division of application No. 17/186,048, filed on Feb. 26, 2021, now Pat. No. 11,449,281, which is a continuation of application No. 16/830,515, filed on Mar. 26, 2020, now Pat. No. 10,970,007.

(51) Int. Cl.
*G06F 3/12* (2006.01)
*H04N 1/00* (2006.01)

(52) U.S. Cl.
CPC .......... *G06F 3/1204* (2013.01); *G06F 3/1222* (2013.01); *G06F 3/1231* (2013.01); *G06F 3/1232* (2013.01); *G06F 3/1238* (2013.01); *G06F 3/1254* (2013.01); *G06F 3/1259* (2013.01); *H04N 1/00427* (2013.01); *G06F 3/1292* (2013.01)

(58) Field of Classification Search
None
See application file for complete search history.

(56) References Cited

U.S. PATENT DOCUMENTS

| 6,903,834 B1 | 6/2005 | Mori |
| 10,412,266 B2 | 9/2019 | Kakutani et al. |
| 2015/0317118 A1 | 11/2015 | Orikasa et al. |
| 2017/0171399 A1 | 6/2017 | Yamada et al. |
| 2017/0177985 A1 | 6/2017 | Hayashi |
| 2017/0230536 A1 | 8/2017 | Haapanen et al. |
| 2018/0227451 A1 | 8/2018 | Sakamoto |
| 2021/0132879 A1* | 5/2021 | Sun ........................ G06F 3/1238 |

OTHER PUBLICATIONS

U.S. Appl. No. 17/186,048, filed Feb. 26, 2021.
U.S. Appl. No. 16/830,515, filed Mar. 26, 2020.
Non-Final Office Action for U.S. Appl. No. 17/186,048 dated Feb. 16, 2022.

* cited by examiner

*Primary Examiner* — Thomas D Lee
(74) *Attorney, Agent, or Firm* — Amin, Turocy & Watson, LLP

(57) ABSTRACT

An image forming system includes a plurality of image forming apparatuses and an information terminal that communicates with the plurality of image forming apparatuses. The information terminal comprises a processor configured to: communicate with the image forming apparatus, and transmit first information relating to a job to the image forming apparatus, receive certification information corresponding to the first information from the image forming apparatus, output the received certification information, and instruct the image forming apparatus to execute the job in response to receiving, from the image forming apparatus, transmission start information associated with the job.

19 Claims, 10 Drawing Sheets

COOPERATIVE COMMUNICATION BETWEEN MOBILE DEVICES AND IMAGE FORMING APPARATUSES

CROSS-REFERENCE TO RELATED APPLICATIONS

This application is a Divisional of application Ser. No. 17/186,048 filed on Feb. 26, 2021, is a Continuation of application Ser. No. 16/830,515 filed on Mar. 26, 2020, the entire contents of both of which are incorporated herein by reference.

FIELD

Embodiments described herein relate generally to an image forming system, an image forming apparatus, and an information terminal.

BACKGROUND

In the related art, a mobile device can instruct an image forming apparatus on the network to perform a job such as printing or scanning. Here, in order to allow the mobile device to designate an image forming apparatus to be an operation target, a complicated work is required. For example, it is required for the mobile device to search the network and to select an image forming apparatus to be the operation target among from a plurality of detected devices. Also in this case, the displayed information is information such as an IP address or a model number of the image forming apparatus in many cases. Therefore, much effort may be required for a user to accurately select an image forming apparatus desired by the user, which becomes a burden to the user with respect to the easiness of the connection.

This problem is not necessarily limited only to a mobile device. Even when an image forming apparatus is designated by a stationary information processing device, the same problem occurs.

DETAILED DESCRIPTION

In general, according to one embodiment, there is provided an image forming system including a plurality of image forming apparatuses, and an information terminal that communicates with the plurality of image forming apparatuses. The information terminal includes a communication unit and a controller. The communication unit communicates with the image forming apparatus. The controller transmits first information relating to the job to the plurality of image forming apparatuses. The controller outputs certification information corresponding to the first information. When transmission start information of the job is received from the image forming apparatus, the controller instructs the image forming apparatus to execute the job. The image forming apparatus includes an input device, a communication unit, a storage unit, and a controller. The input device receives an input. The communication unit communicates with the information terminal. The storage unit stores data. After the first information is received, the controller transmits transmission start information of the job to the information terminal which is a transmission source of the first information. When the certification information is input by the input device, the controller executes the job corresponding to the certification information.

Figure 1:
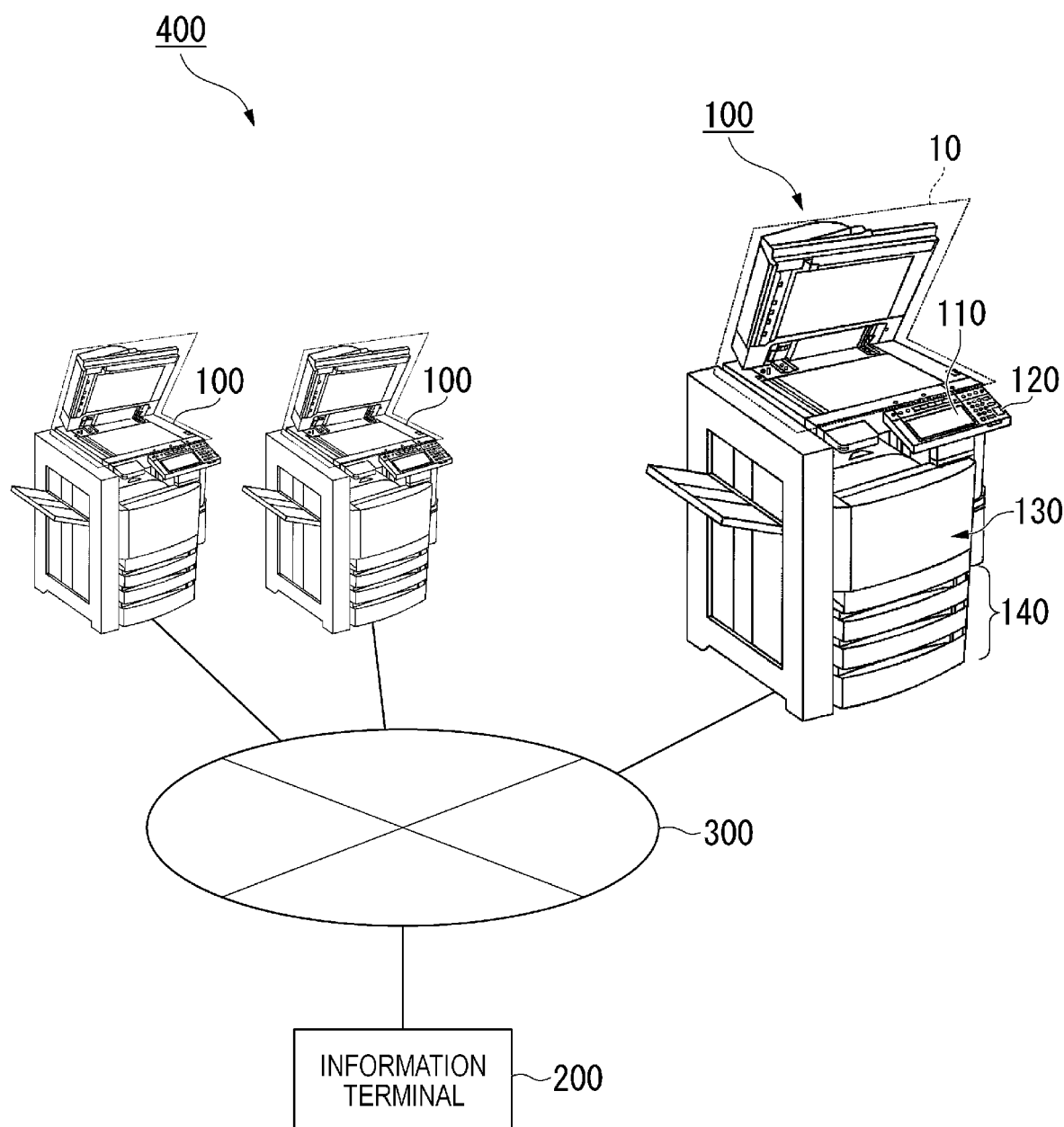
FIG. 1 is a diagram illustrating a configuration example of an image forming system according to an embodiment.

Hereinafter, the image forming system, the image forming apparatus, and the information terminal according to the embodiment are described with reference to the drawings. FIG. 1 is a diagram illustrating a configuration example of an image forming system 400 according to the embodiment. The image forming system 400 includes one or a plurality of image forming apparatuses 100 and an information terminal 200. The image forming apparatus 100 is a device for forming an image on a sheet. The image forming apparatus 100 is, for example, a multifunctional peripheral. The information terminal 200 is an information processing device that transmits a job such as image formation to each of the image forming apparatuses 100. The image forming apparatus 100 and the information terminal 200 are communicably connected to each other via a network 300. Hereinafter, each device is described in detail.

Figure 2:
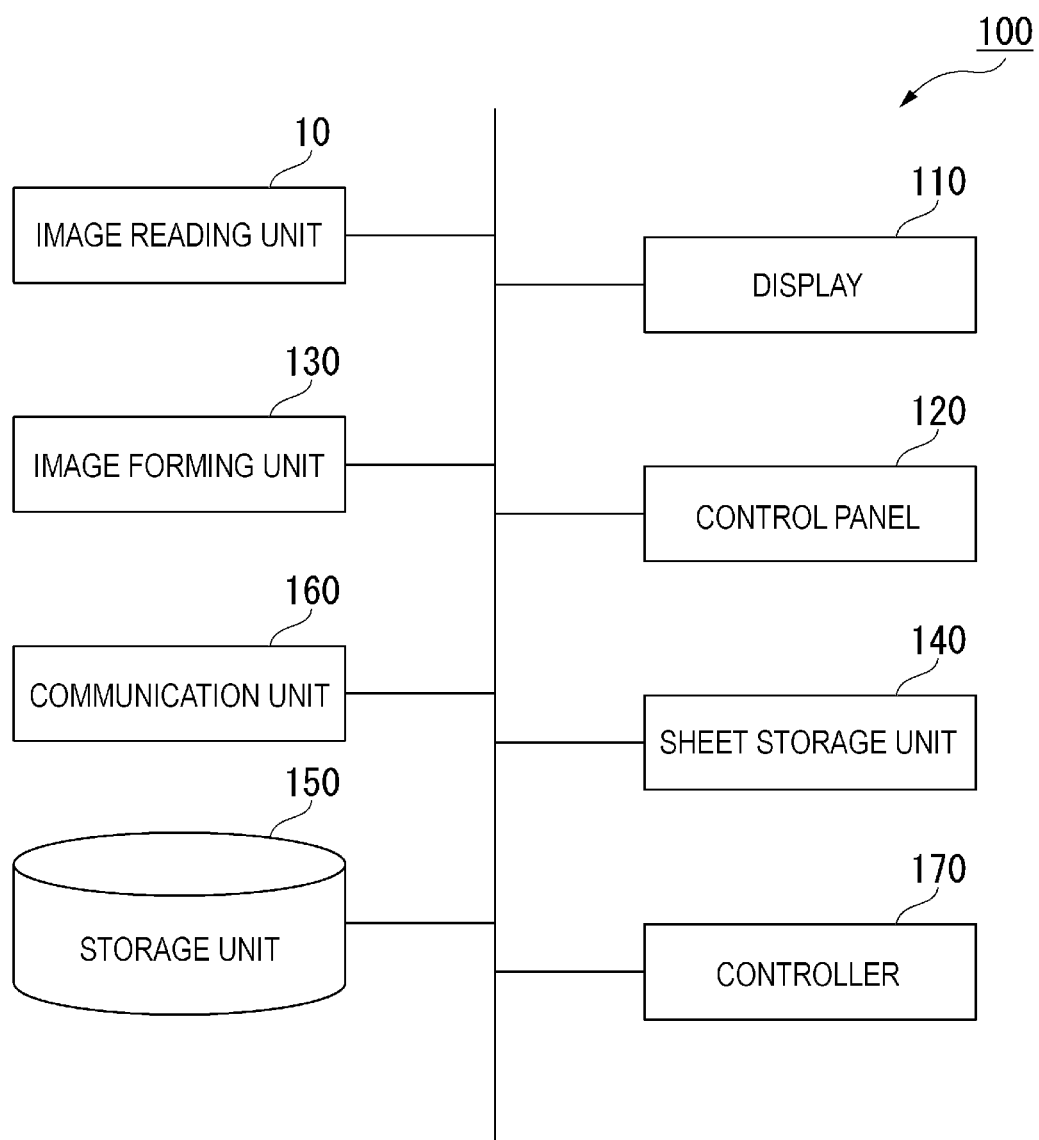
FIG. 2 is a hardware block diagram of an image forming apparatus.

FIG. 2 is a hardware block diagram of the image forming apparatus 100 according to the embodiment. First, the image forming apparatus 100 is specifically described by using FIGS. 1 and 2. The image forming apparatus 100 includes an image reading unit 10, a display 110, a control panel 120, an image forming unit 130, a sheet storage unit 140, a storage unit 150, a communication unit 160, and a controller 170.

The image forming apparatus 100 forms an image on a sheet with a developer such as a toner or ink. Anything can be used as the sheet, as long as the image forming apparatus 100 can form an image on the surface thereof.

The image reading unit 10 reads the image information of the reading target based on brightness and darkness of light. The image reading unit 10 records the read image information. The recorded image information may be transmitted to another information processing device via the network 300. The recorded image information may be used for image formation on a sheet by the image forming unit 130.

The display 110 is an image display device such as a liquid crystal display or an organic electroluminescence (EL) display. The display 110 displays various kinds of information relating to the image forming apparatus 100.

The control panel 120 includes an operation device such as a plurality of buttons. The control panel 120 receives an operation of a user. For example, the control panel 120 may receive an input of numbers and characters. For example, the control panel 120 may receive an operation of selecting one or a plurality of jobs from candidates displayed on the display 110. The control panel 120 outputs a signal in response to the operation performed by the user to the controller 170. The display 110 and the control panel 120 may be configured as an integrated touch panel.

The image forming unit 130 forms an image on a sheet based on the image information generated by the image reading unit 10 and the image information received via a communication channel. The image forming unit 130 includes, for example, a photosensitive drum, an exposing device, a developing device, a transfer device, and a fixing device.

The sheet storage unit 140 stores sheets to be used in the image formation in the image forming unit 130. In the sheet storage unit 140, conveyance rollers are provided. The conveyance roller conveys the sheets stored in the sheet storage unit 140 to a conveyance path connected to the image forming unit 130.

The storage unit 150 is configured by using a storage device such as a magnetic hard disk device or a semiconductor storage device. The storage unit 150 stores data required when the image forming apparatus 100 operates. The storage unit 150 may temporarily store data of an image formed in the image forming apparatus 100.

The communication unit 160 is configured by using a communication interface. The communication unit 160 communicates with another device (for example, the information terminal 200) via the network 300.

The controller 170 is configured by using a processor such as a central processing unit (CPU) and a memory. The controller 170 reads and executes a program stored in the storage unit 150 in advance. The controller 170 controls an operation of each device included in the image forming apparatus 100. For example, when the controller 170 receives an image forming request from the information terminal 200, the controller 170 may control its own device to form an image on a sheet in response to the received image forming request.

Figure 3:
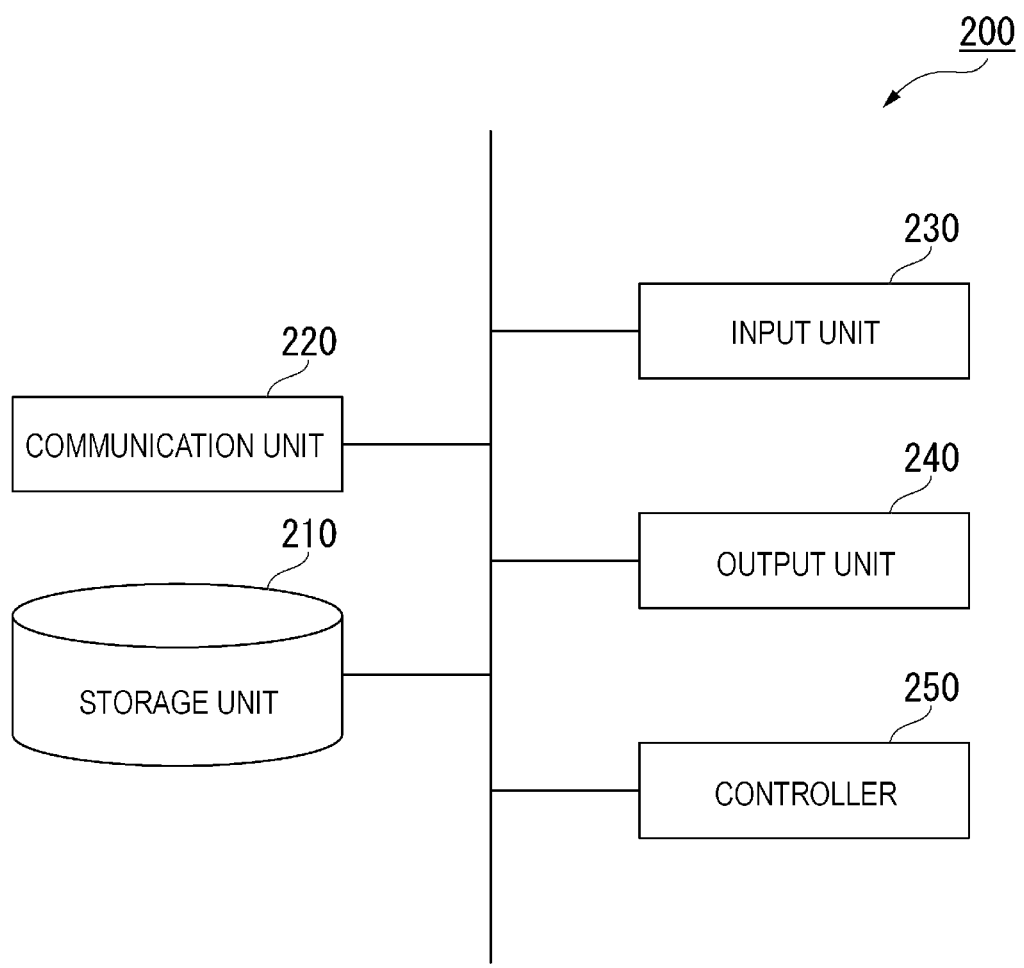
FIG. 3 is a hardware block diagram of an information terminal.

FIG. 3 is a hardware block diagram of the information terminal 200. Subsequently, details of the information terminal 200 are described. The information terminal 200 is an information processing device such as a smartphone, a personal computer, a workstation, a game device, and a television set. The information terminal 200 includes a storage unit 210, a communication unit 220, an input unit 230, an output unit 240, and a controller 250.

The storage unit 210 is configured by using a storage device such as a magnetic hard disk device or a semiconductor storage device. The storage unit 210 stores data required when the information terminal 200 operates. The storage unit 210 stores a program code of a certain application installed in the information terminal 200 in advance. The storage unit 210 stores identification information indicating its own device. Specific examples of such identification information include an IP address, a pre-assigned ID, and a terminal name used on the network 300.

The communication unit 220 is configured by using a communication interface. The communication unit 220 communicates with another device (for example, the image forming apparatus 100) via the network 300.

The input unit 230 is configured by using an existing input device such as a keyboard, a pointing device (a mouse, a tablet, and the like), a button, and a touch panel. The input unit 230 is operated by a user when the instruction of the user is input to the information terminal 200. The input unit 230 may be an interface for connecting the input device to the information terminal 200. In this case, the input unit 230 inputs an input signal generated in response to the input of the user in the input device to the information terminal 200. The input unit 230 may be configured by using a microphone and a voice recognition device. In this case, the input unit 230 voice-recognizes the word spoken by the user, and inputs the character string information of the recognition result to the information terminal 200. Any configuration can be used as the input unit 230, as long as the instruction of the user can be input to the information terminal 200.

The output unit 240 is configured by using an output device and outputs data to the user of the information terminal 200. The output device may be configured by using a device that outputs an image or a character to a screen. For example, the output device can be configured by using a cathode ray tube (CRT), a liquid crystal display, an organic electroluminescence (EL) display, or the like. The output device may be configured by using a device that converts characters into a voice and outputs the voice. In this case, the output device can be configured by using a voice synthesis device and a voice output device (speaker). The output unit 240 may be an interface for connecting the output device to the information terminal 200.

The controller 250 is configured by using a processor such as a CPU and a memory. The controller 250 reads and executes the program stored in the storage unit 210 in advance. The controller 250 controls the operation of each device included in the information terminal 200.

Figure 4:
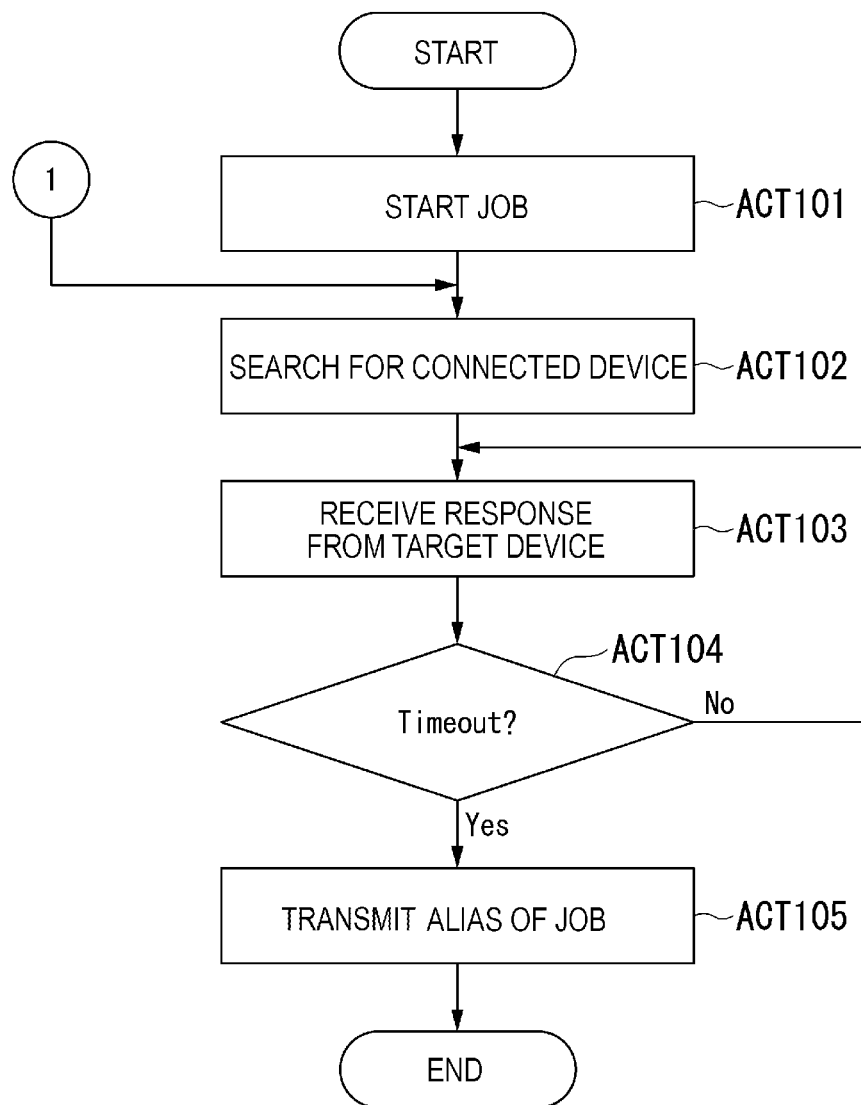
FIG. 4 is a flowchart for describing a flow of processing until an alias of a job is transmitted from the information terminal to the image forming apparatus.

Next, specific examples of the operation of the information terminal 200 are described. FIG. 4 is a flowchart for describing a flow of processing until the identification information (hereinafter, referred to as an "alias") of the job is transmitted from the information terminal 200 to the image forming apparatus 100. The alias corresponds to first information. First, when a job is designated to the image forming apparatus 100 by an operation of a user, the job is started (ACT101). Examples of the job include a job indicating execution of printing and a job indicating start of scanning. When a job is started, the controller 250 generates an alias corresponding to the job. The controller 250 records the information and alias relating to the job in the storage unit 210 in association with each other. Examples of the information relating to the job include information indicating the date and time when the job is designated and a data file that is a target of the job (for example, printing). Examples of the alias include information (for example, a file name) indicating a data file that is a target of the job or information obtained by combining an incremented number with information (for example, a user ID) indicating a user. Any information can be used as the alias, as long as the information is unique information enough to allow the user to browse the alias to identify a job to be a target to be executed from a plurality of jobs.

When the job is started, the controller 250 starts searching for a device connected to the network 300 (ACT102). Such processing may be realized, for example, by a command such as broadcast of Simple Network Management Protocol (SNMP). More specifically, the controller 250 may request a response of a value of a specific OID (for example, sysDescr or sysObjectID) to each device connected to the network 300 by broadcast.

The controller 250 receives a response from each device connected to the network 300 (ACT103). When the OID is requested, the controller 250 receives the value of the OID from each device. The controller 250 continues to receive a response for a predetermined time until timeout (ACT104).

The controller 250 determines a transmission destination of the alias of the job based on the content of the received response (for example, the value of the OID). The transmission destination of the alias of the job is the image forming apparatus 100 that satisfies a predetermined condition of being connected to the network 300. The predetermined condition corresponds to, for example, an application installed in the information terminal 200. For example, as long as the image forming apparatus 100 is a product of the same company as the company which is a source of providing the application, it may be determined that the predetermined condition is satisfied. The controller 250 transmits the alias of the job designated to the user to one or the plurality of image forming apparatuses 100 that are determined as the transmission destination of the alias (ACT105).

When the controller 250 transmits the alias of the job to the image forming apparatus 100, the controller 250 receives a PIN code from the image forming apparatus 100. When receiving the PIN code, the controller 250 outputs the received PIN code. The controller 250 may, for example, display the received PIN code on a screen, or output a voice indicating the PIN code from a speaker.

When the user inputs the PIN code to the image forming apparatus 100, the controller 250 receives a transmission start instruction of the job from the image forming apparatus 100. When receiving the transmission start instruction of the job, the controller 250 reads a job body (for example, data file) corresponding to the identification information (for example, alias) included in the received transmission start instruction from the storage unit 210. The controller 250 transmits the read job body to the image forming apparatus 100 which is a transmission source of the transmission start instruction.

When the job is executed by the image forming apparatus 100, the controller 250 receives completion notification of the job from the image forming apparatus 100. When receiving the completion notification of the job, the controller 250 outputs the received completion notification. The controller 250, for example, may display the received completion notification on the screen or may output a voice indicating the completion notification from the speaker.

Figure 5:
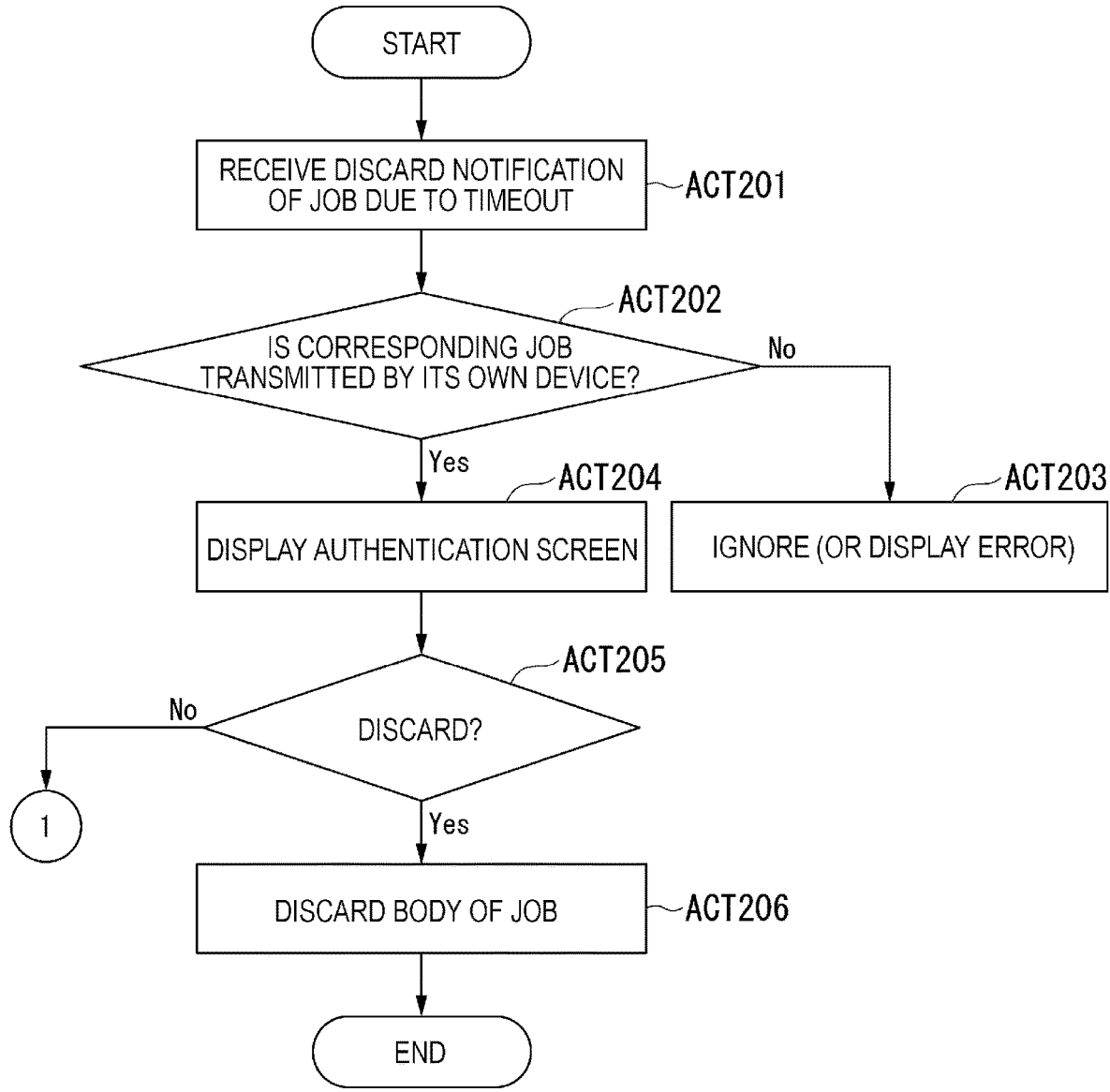
FIG. 5 is a flowchart for describing a flow of processing of the information terminal when discard notification of the job due to timeout is received from the image forming apparatus.

FIG. 5 is a flowchart for describing a flow of processing of the information terminal 200 when discard notification of the job due to timeout is received from the image forming apparatus 100. First, the controller 250 of the information terminal 200 receives the discard notification of the job due to timeout from the image forming apparatus 100 (ACT201). The discard notification of the job includes identification information (for example, alias) indicating a target job to be discarded and identification information of the information terminal 200 of the transmission source of the job. The controller 250 determines whether the received discard notification of the job is a job transmitted in the past by its own device (ACT202). When the received discard notification of the job is not a job transmitted from its own device (ACT202-NO), the controller 250 ignores the discard notification and does not perform particular processing (ACT203). In this case, an error may be output from the output unit 240.

Meanwhile, when the received discard notification of the job is a job transmitted from its own device (ACT202-YES), the controller 250 outputs information for authenticating whether the job is to be discarded to the user (ACT204). For example, the controller 250 may display a predetermined authentication screen on the display. For example, the controller 250 may output a predetermined authentication voice from the speaker.

Thereafter, when being instructed to discard the job by the user (ACT205-YES), the controller 250 discards a body of the job that is the target (ACT206). For example, the controller 250 deletes the information relating to the job stored in the storage unit 210. Meanwhile, when being instructed to continue the job by the user (ACT205-NO), the controller 250 executes the processing subsequent to ACT102 of FIG. 4 with respect to the job that is the target. By such processing, with respect to the job for which the discard notification is once transmitted, the alias is transmitted again to the image forming apparatus 100, and the job continues.

Figure 6:
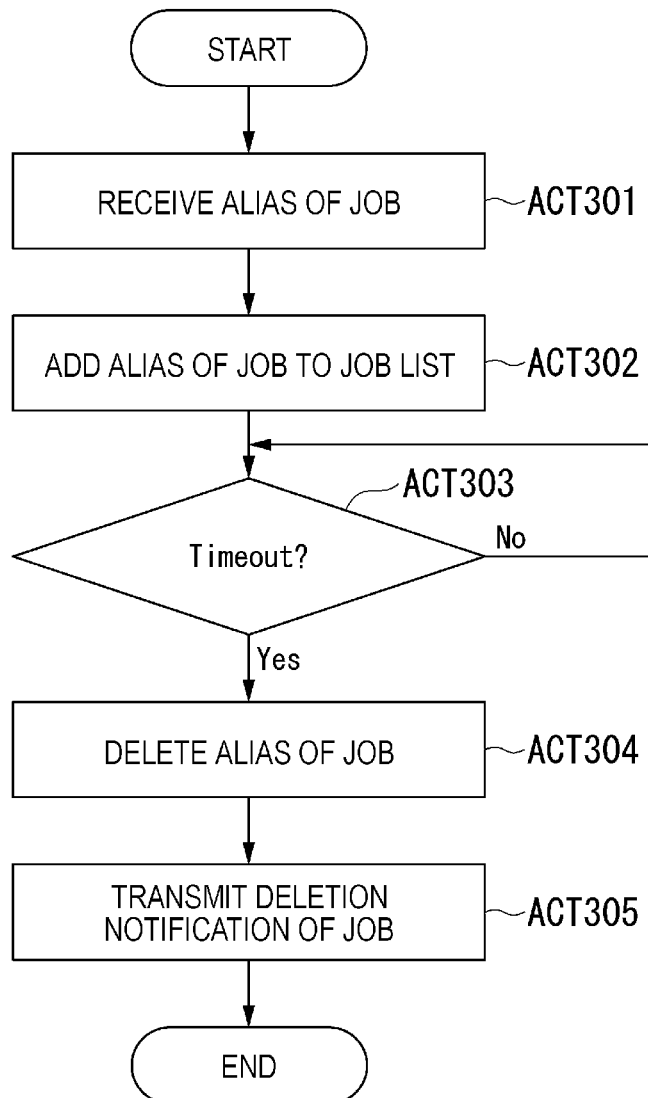
FIG. 6 is a flowchart for describing a flow of processing after the alias of the job is transmitted from the information terminal to the image forming apparatus.

Subsequently, specific examples of the operation of the image forming apparatus 100 are described. FIG. 6 is a flowchart for describing a flow of processing after the alias of the job is transmitted from the information terminal 200 to the image forming apparatus 100. First, when the alias of the job is transmitted from the information terminal 200, the controller 170 of the image forming apparatus 100 receives the alias of the job (ACT301). The controller 170 adds the job indicated by the newly received alias to the job list stored in the storage unit 150 (ACT302).

The controller 170 determines whether each job is timeout by measuring the predetermined time (ACT303). When a job is the timeout, the controller 170 deletes the job which is timeout from the job list stored in the storage unit 150 (ACT304). Also, the deletion notification of the job including the identification information (for example, alias) of the timeout job is transmitted to the network 300 (ACT305).

Figure 7:
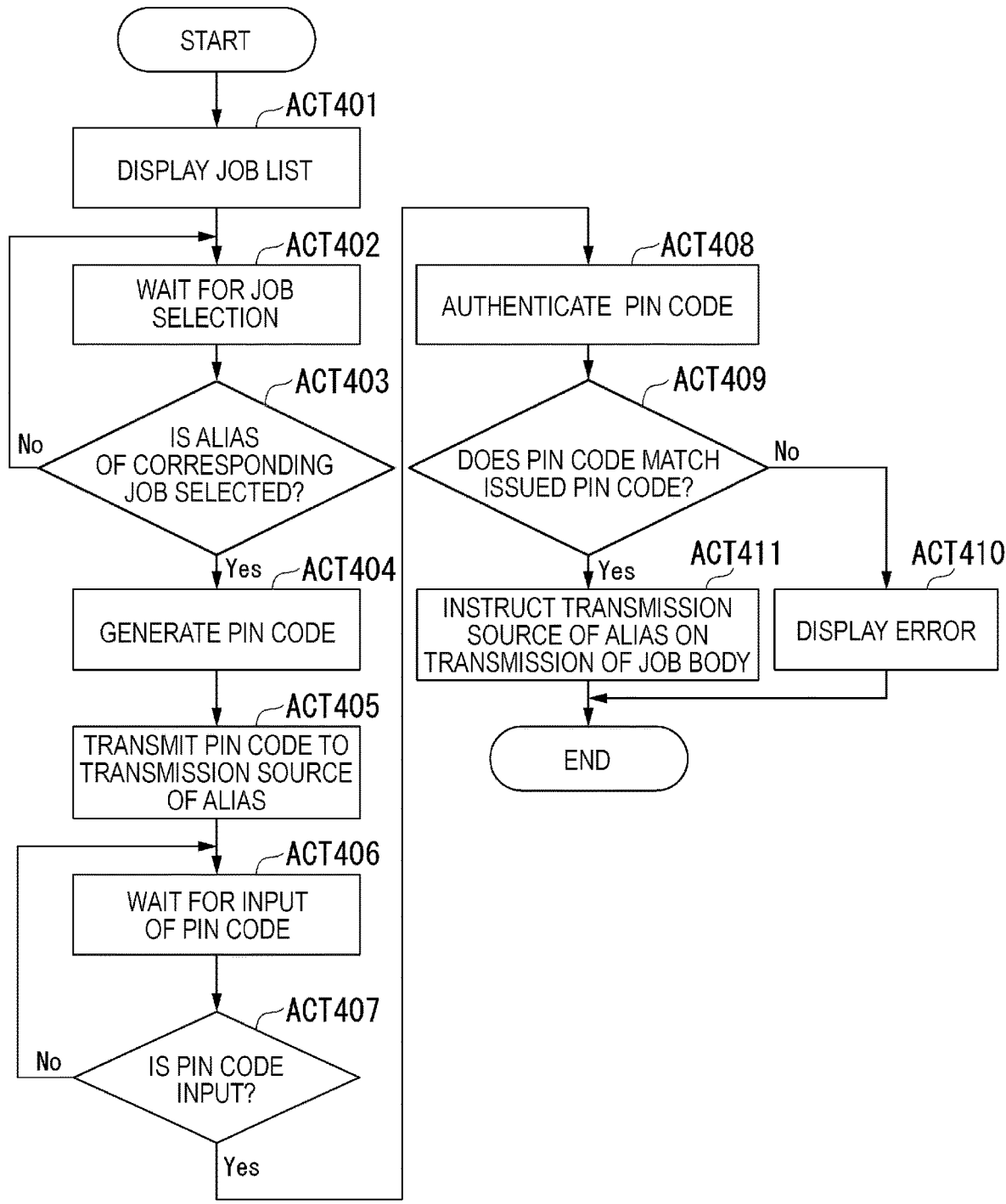
FIG. 7 is a flowchart for describing a flow of processing after a user instructs the image forming apparatus to display a job list.

FIG. 7 is a flowchart for describing a flow of processing after the user instructs the image forming apparatus 100 to display a job list. First, the user operates the control panel 120 of the image forming apparatus 100 to input an instruction for displaying the job list. In response to the instruction, the controller 170 reads the information of the job list from the storage unit 150 and displays the read information of the job list on the display 110 (ACT401).

The controller 170 waits for the selection of the job by the operation of the control panel 120 (ACT402 and ACT403-NO). When the job is selected (ACT403-YES), the controller 170 generates the PIN code corresponding to the selected job and records the PIN code and the identification information (for example, alias) of the job in the storage unit 150 in association with each other (ACT404). The controller 170 transmits the generated PIN code to the information terminal 200 which is the transmission source of the alias of the job (ACT405).

The controller 170 waits for an input of a PIN code by the operation of the control panel 120 (ACT406 and ACT407-NO). When the PIN code is input (ACT407-YES), the controller 170 authenticates whether association of the job selected in ACT403 and the PIN code input in ACT407 is identical to that recorded in the storage unit 150 (ACT408). When the association is not identical to each other (ACT409-NO), the controller 170 outputs an error. For example, the controller 170 displays a screen indicating an error on the display 110 (ACT410). Meanwhile, when the association is identical to each other (ACT409-YES), the controller 170 transmits the transmission start instruction of the job to the information terminal 200 which is the transmission source of the alias of the job (ACT411).

Figure 8:
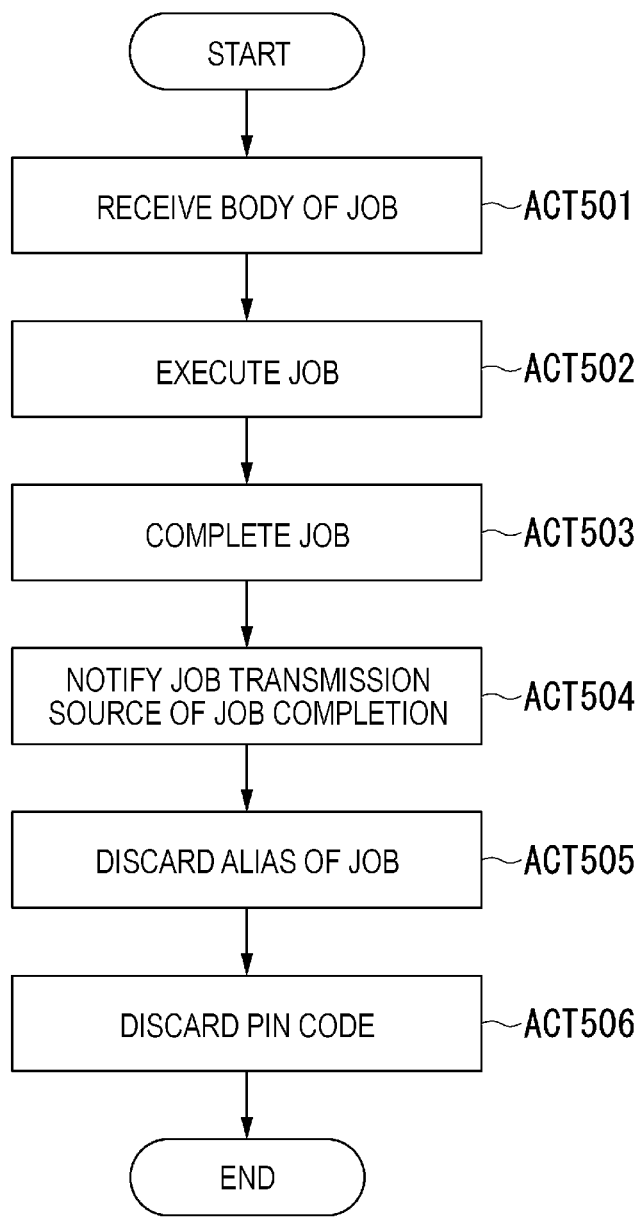
FIG. 8 is a flowchart for describing a flow of processing after a body of the job is transmitted from the information terminal to the image forming apparatus.

FIG. 8 is a flowchart for describing a flow of processing after the body of the job is transmitted from the information terminal 200 to the image forming apparatus 100. First, when the body of the job is transmitted from the information terminal 200 to the image forming apparatus 100, the controller 170 receives the body of the job (ACT501). The controller 170 executes the received job (ACT502). When the job is completed (ACT503), the controller 170 transmits the completion notification of job to the information terminal 200 which is the transmission source of the job (ACT504). The controller 170 deletes the information (for example, the alias or the PIN code) relating to the completed job from the job list stored in the storage unit 150 (ACT505 and ACT506).

Figure 9:
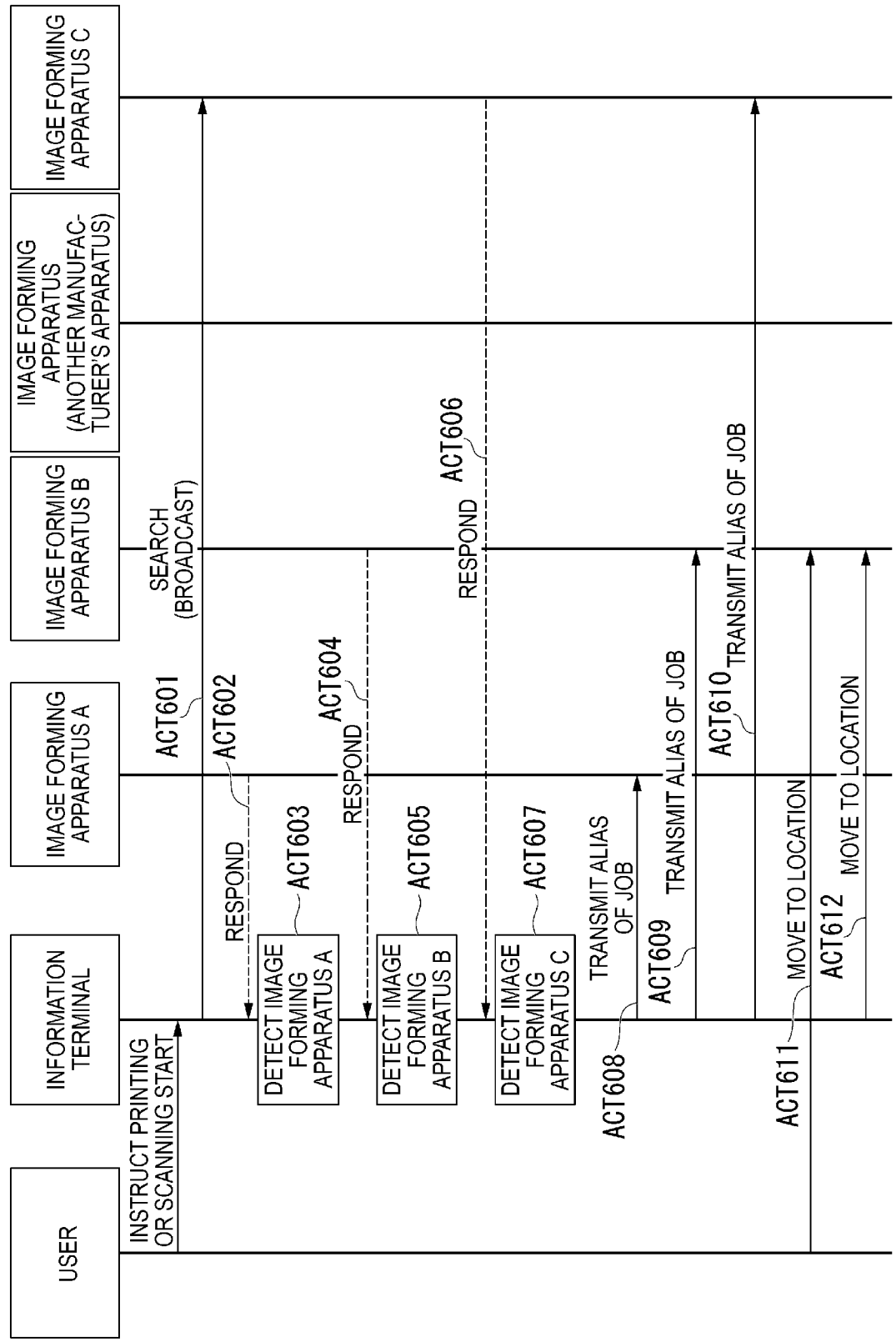
FIG. 9 is a sequence chart of an operation example of the image forming system.
Figure 10:
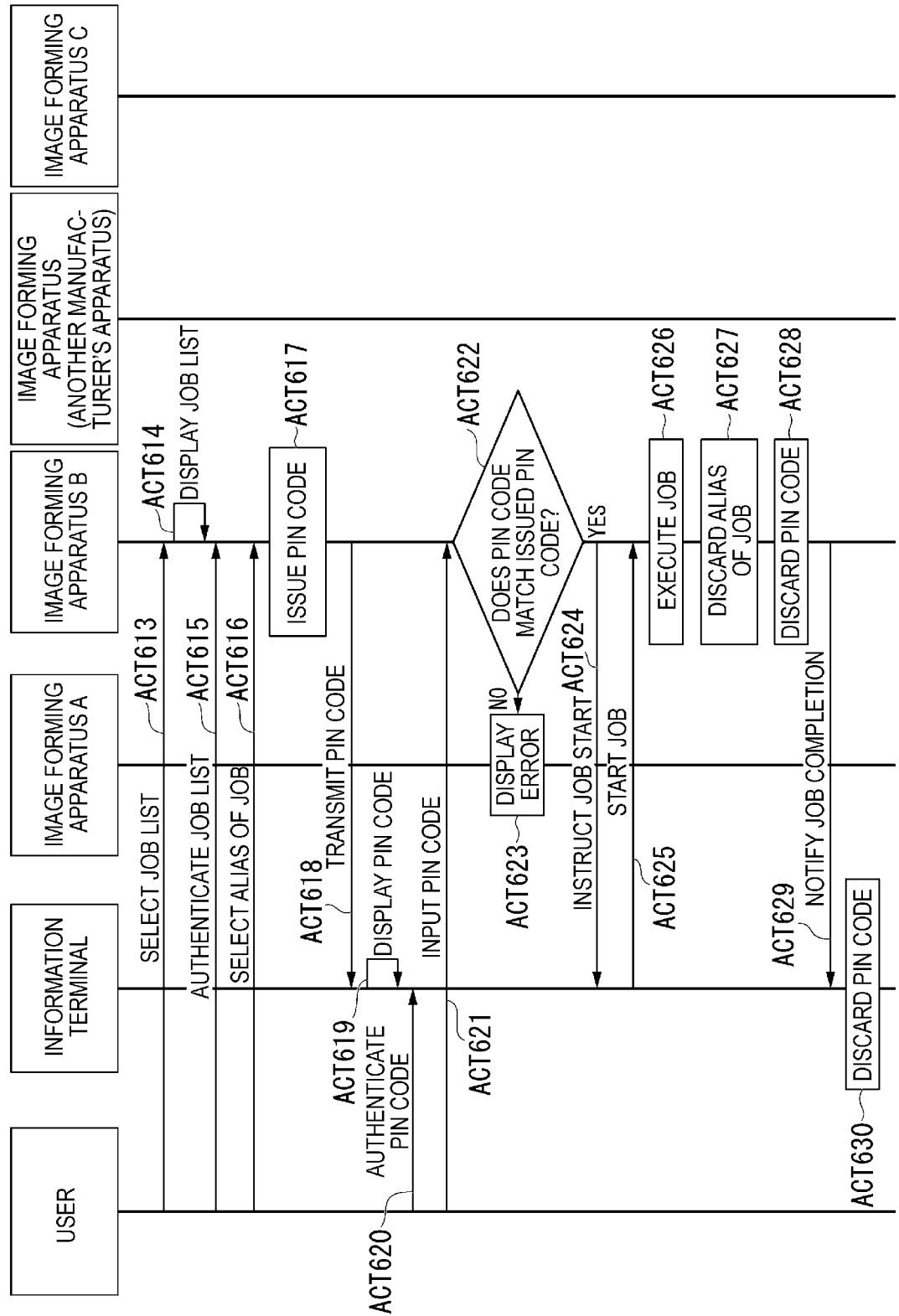
FIG. 10 is a sequence chart of an operation example of the image forming system.

Subsequently, specific examples of the flow of the operation of the image forming system 400 are described. FIGS. 9 and 10 are sequence charts of operation examples of the image forming system 400. First, the user operates the information terminal 200 to start a predetermined application installed in advance. The user performs an operation for instructing the image forming apparatus 100 to execute a job (for example, printing or scanning) via the application.

When receiving the instruction of the execution of the job from the user, the controller 250 starts searching for a device connected to the network 300 (ACT601). For example, the controller 250 broadcasts a code indicating a search in the network 300. Each device connected to the network 300 transmits a response in response to the broadcast. For example, an image forming apparatus A, an image forming apparatus B, and an image forming apparatus C each transmit responses to the information terminal 200 (ACT602, ACT604, and ACT606). The controller 250 receives the responses to detect the image forming apparatus A, the image forming apparatus B, and the image forming apparatus C (ACT603, ACT605, and ACT607).

In FIG. 9, the embodiment in which an image forming apparatus manufactured by another manufacturer does not transmit a response is illustrated, but an image forming apparatus manufactured by another manufacturer may respond. In that case, the controller 250 determines that the image forming apparatus (manufactured by the other manufacturer) may not be a candidate of the transmission destination of the alias of the job based on a content (for example, OID) of the response of the image forming apparatus manufactured by the other manufacturer. The controller 250 transmits the alias of the job to each of the image forming apparatuses 100 (the image forming apparatus A, the image forming apparatus B, and the image forming apparatus C) that are determined to be the candidates of the transmission destinations based on the received responses (ACT608, ACT609, and ACT610).

Thereafter, the user carries the information terminal 200 and moves to the desired image forming apparatuses 100 (ACT611 and ACT612). The user operates the control panel 120 of the image forming apparatus 100 to input an instruction for displaying the job list (ACT613). The controller 170 of the image forming apparatus 100 displays the job list to the display 110 (ACT614). The user authenticates the displayed job list (ACT615) and selects an alias of a desired job in the control panel 120 (ACT616).

When the job is selected, the controller 170 of the image forming apparatus 100 issues a PIN code corresponding to the selected job (ACT617). The controller 170 transmits the generated PIN code to the information terminal 200 which is the transmission source of the alias of the job (ACT618). When the PIN code is received, the controller 250 of the information terminal 200 displays the received PIN code (ACT619). The user authenticates the displayed PIN code (ACT620) and operates the control panel 120 of the image forming apparatus 100 to input a PIN code (ACT621).

When the PIN code is input, the controller 170 authenticates whether the association of the job selected in ACT616 and the PIN code input in ACT621 is identical to that recorded in the storage unit 150 (ACT622). When the association is not identical to each other (ACT622-NO), the controller 170 displays an error on the display 110 (ACT623). Meanwhile, the association is identical to each other (ACT622-YES), the controller 170 transmits the transmission start instruction of the job to the information terminal 200 which is the transmission source of the alias of the job (ACT624).

When receiving the transmission start instruction of the job from the image forming apparatus 100, the controller 250 of the information terminal 200 reads the body of the job from the storage unit 210. The controller 250 transmits the read body of the job to the image forming apparatus 100 which is the transmission source of the transmission start instruction (ACT625).

When the body of the job transmitted from the information terminal 200 is received, the controller 170 executes the received job (ACT626). When the job is completed, the controller 170 deletes the alias or the PIN code relating to the completed job from the job list stored in the storage unit 150 (ACT627 and ACT628). The controller 170 transmits the completion notification of the job to the information terminal 200 which is the transmission source of the completed job (ACT629). When receiving the completion notification of the job from the image forming apparatus 100, the controller 250 of the information terminal 200 outputs the received completion notification. Also, the controller 250 deletes the PIN code corresponding to the job of the received completion notification from the storage unit 210 (ACT630).

In the image forming system 400 configured in this manner, when a job is executed by using the desired image forming apparatus 100, the user does not have to perform a complicated work such as acquiring identification information of the desired image forming apparatus 100 or selection from the list. The user may move to the desired image forming apparatus 100, operates the control panel 120 of the image forming apparatus 100 so that a job list is displayed, and select an alias of the desired job. Therefore, the desired image forming apparatus 100 can be easily selected.

Hereinafter, a modification example of the image forming apparatus 100 is described.

In the sequence chart illustrated in FIG. 10, the PIN code is generated by the image forming apparatus 100, but the information terminal 200 may generate the PIN code. For example, when the job is selected in ACT616, the controller 170 of the image forming apparatus 100 displays a screen for receiving an input of a PIN code. The controller 170 transmits the transmission start instruction of the job to the information terminal 200. When receiving the transmission start instruction of the job from the image forming apparatus 100, the controller 250 of the information terminal 200 generates the PIN code associated with the body of the job and records the PIN code in the storage unit 210. The controller 250 outputs the generated PIN code to the user via the output unit 240. For example, the controller 250 displays the PIN code on the image display device corresponding to the output unit 240. The user operates the control panel 120 of the image forming apparatus 100 to input the displayed PIN code. When the PIN code is input, the controller 170 transmits the input PIN code to the information terminal 200. When receiving the PIN code from the image forming apparatus 100, the controller 250 of the information terminal 200 collates the PIN code stored in the storage unit 210 and the received PIN code. When the PIN codes are identical to each other, the controller 250 reads the body of the job from the storage unit 210. Also, the controller 250 transmits the read body of the job to the image forming apparatus 100 which is the transmission source of the transmission start instruction. The controller 170 of the image forming apparatus 100 executes the received job (ACT626). Processing subsequent to this processing is as illustrated in FIG. 10. In this configuration, the PIN codes are collated by the information terminal 200 without the PIN codes being transmitted on the network. Therefore, the same effect can be obtained in this configuration.

Another modification example is described. The controller 170 of the image forming apparatus 100 that receives the alias of the job may use short-range wireless communication to obtain the identification information (for example, IP address) of the adjacent information terminal 200. Also, when the obtained identification information is identical to the identification information of the transmission source of the alias of the job, the display 110 may be allowed to perform a predetermined display. The predetermined display, for example, may be a character or an image indicating that the alias is received or may be lighting of a lamp. Also, the predetermined display may be a display of a job list or may be a display of a screen for inputting a PIN code. According to this configuration, the user can easily determine whether the image forming apparatus 100 close to the user is the image forming apparatus 100 corresponding to the application operated by the user.

The PIN code used in the present embodiment is an aspect of the certification information. The certification information does not have to be a PIN code. For example, the certification information may be encoded image information such as a one-dimensional barcode or a two-dimensional barcode. In this case, the user may use a scanner of the image forming apparatus 100 to input the encoded information displayed on the screen of the information terminal 200 to the image forming apparatus 100. The certification information may be a simple signal sequence that is invisible to human eyes. In this case, the user may use the proximity wireless communication performed between the information terminal 200 and the image forming apparatus 100 to transmit the certification information from the information terminal 200 to the image forming apparatus 100.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information terminal configured to operate in cooperation with an image forming apparatus of image forming apparatuses, comprising:
    a processor configured to:
    communicate with the image forming apparatus; and
    transmit first information relating to a job to the image forming apparatus, receive, as received certification information, certification information corresponding to the first information from the image forming apparatus, output the received certification information to the image forming apparatus, and cause the image forming apparatus to execute the job in response to receiving, from the information terminal, transmission start information associated with the job, wherein the transmission start information represents encoded image data representative of a signal sequence unobservable by a user identity, and wherein the signal sequence is conveyed via proximity wireless communication between the information terminal and the image forming apparatus.

2. The information terminal according to claim 1, wherein the processor is configured not to transmit information on a body of the job to the image forming apparatus until the certification information is received.

3. The information terminal according to claim 1, wherein each image forming apparatus of the image forming apparatuses includes a display, and
    wherein the processor causes the display of at least one of the image forming apparatuses to display a job list in response to receiving an instruction for displaying the job list after the first information is received, and transmits the transmission start information to the information terminal which is a transmission source of the job selected from the job list.

4. The information terminal according to claim 1, wherein the information terminal is a smartphone, a mobile computer, a personal computer, a workstation, a game device, or a television set.

5. The information terminal according to claim 1, further comprising a storage device that stores an IP address.

6. The information terminal according to claim 1, wherein communication with the image forming apparatus is performed in a wireless manner.

7. The information terminal according to claim 1, wherein communication with the image forming apparatus is performed in a wired manner.

8. A method for an information terminal configured to operate in cooperation with an image forming apparatus, comprising:
    communicating with the image forming apparatus;
    transmitting first information relating to a job to the image forming apparatus;
    receiving, as received certification information, certification information corresponding to the first information from the image forming apparatus;
    outputting the received certification information to the image forming apparatus; and
    causing the image forming apparatus to execute the job in response to receiving, from the information terminal, transmission start information associated with the job, wherein the transmission start information represents encoded image data representative of a signal sequence unobservable by a user identity, and wherein the signal sequence is conveyed via proximity wireless communication between the information terminal and the image forming apparatus.

9. The method according to claim 8, wherein information on a body of the job is not transmitted to the image forming apparatus until the certification information is received.

10. The method according to claim 8, further comprising displaying a job list on a display device in response to receiving an instruction for displaying the job list after the first information is received, and transmitting the transmission start information to the information terminal which is a transmission source of the job selected from the job list.

11. The method according to claim 8,
wherein the information terminal is a smartphone, a mobile computer, a personal computer, a workstation, a game device, or a television set.

12. The method according to claim 8, further comprising storing an IP address.

13. The method according to claim 8, further comprising communicating with the image forming apparatus in a wireless manner.

14. The method according to claim 8, further comprising communicating with the image forming apparatus in a wired manner.

15. A smartphone configured to operate in cooperation with an image forming apparatus, comprising:
a processor configured to:
communicate with the image forming apparatus; and
transmit first information relating to a job to the image forming apparatus, receive, as received certification information, certification information corresponding to the first information from the image forming apparatus, output the received certification information to the image forming apparatus, and cause the image forming apparatus to execute the job in response to receiving, from the smartphone, transmission start information associated with the job, wherein the transmission start information represents encoded image data representative of a signal sequence unobservable by a user identity, and wherein the signal sequence is conveyed via proximity wireless communication between the smartphone and the image forming apparatus.

16. The smartphone according to claim 15,
wherein the processor is configured not to transmit information on a body of the job to the image forming apparatus until the certification information is received.

17. The smartphone according to claim 15,
wherein the image forming apparatus includes a display device, and
wherein the processor causes the display device of the image forming apparatus to display a job list on the display device in response to receiving an instruction for displaying the job list after the first information is received, and transmits the transmission start information to the smartphone which is a transmission source of the job selected from the job list.

18. The smartphone according to claim 15, further comprising a storage device that stores an IP address.

19. The smartphone according to claim 15,
wherein communication with the image forming apparatus is performed in a wireless manner.

* * * * *